United States Patent
Wade

[15] 3,653,059
[45] Mar. 28, 1972

[54] POLARITY REVERSING MEANS FOR MOVING PEN GRAPHICAL RECORDER

[72] Inventor: John M. Wade, Poway, Calif.
[73] Assignee: Hewlett-Packard Company, Palo Alto, Calif.
[22] Filed: Apr. 23, 1971
[21] Appl. No.: 136,827

[52] U.S. Cl. ............................ 346/32, 318/663, 324/100
[51] Int. Cl. .......................................................... G01d 3/06
[58] Field of Search ................... 346/32; 324/99 R, 100; 318/628, 663, 678

[56] References Cited

UNITED STATES PATENTS

| | | | |
|---|---|---|---|
| 2,973,238 | 2/1961 | Herzog | 346/32 |
| 3,453,644 | 1/1969 | Tackabery | 346/32 |

*Primary Examiner*—Richard B. Wilkinson
*Attorney*—Stephen P. Fox

[57] ABSTRACT

A circuit for a moving pen graphical recorder has a first polarity reversing switch coupled between a servoamplifier and a servomotor which drives the pen, and a second polarity reversing switch coupled between a reference voltage source and a variable position feedback potentiometer responsive to pen movements.

3 Claims, 2 Drawing Figures

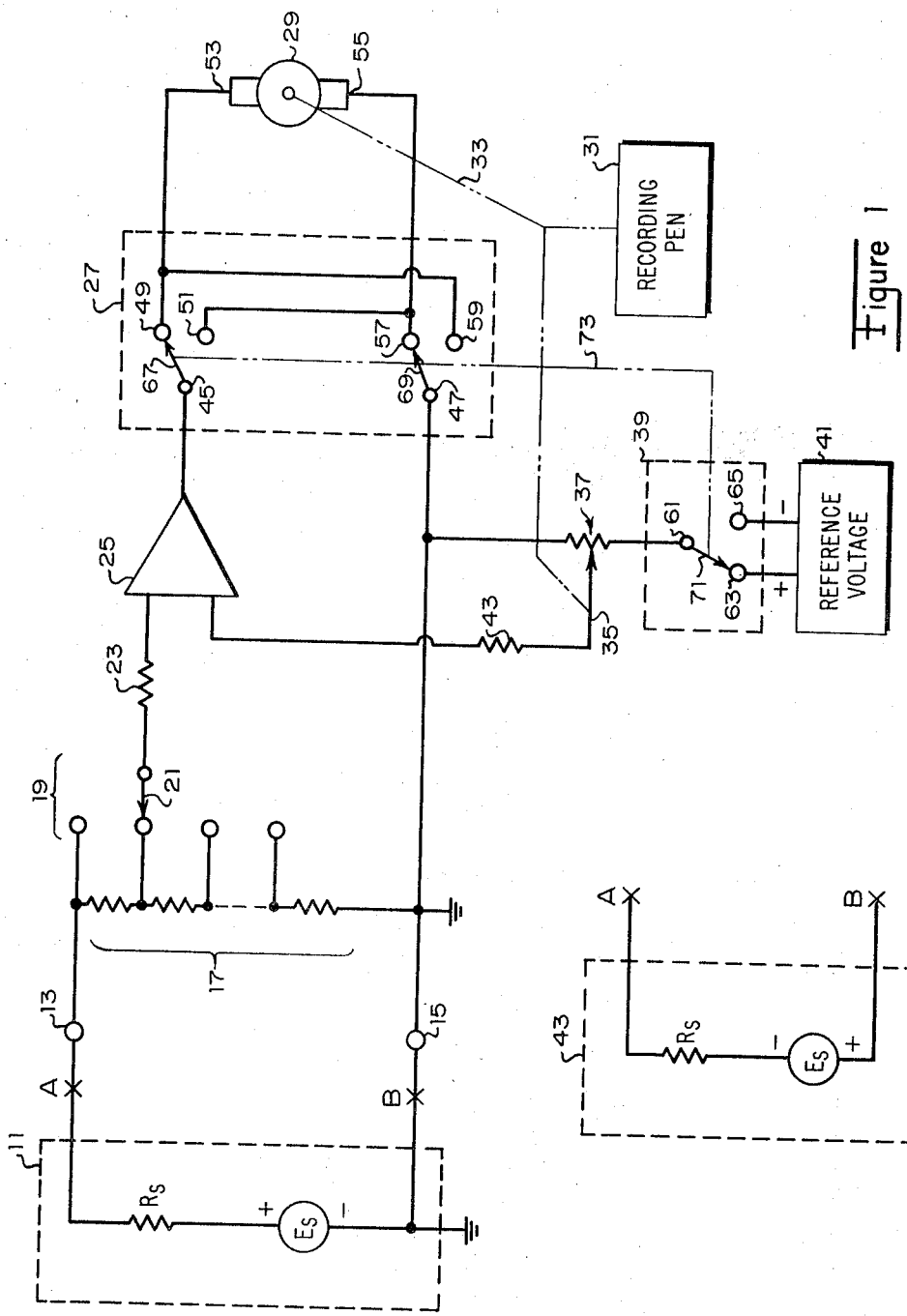

POLARITY REVERSING MEANS FOR MOVING PEN GRAPHICAL RECORDER

BACKGROUND OF THE INVENTION

A typical chart recorder has a pair of input terminals for receiving signals from an external source to move the pen. The signal from the external source is generally unbalanced, i.e., the signal is provided on two output lines, one of which has a lower impedance to ground than the other. The input terminals of the recorder are similarly unbalanced because one is a common terminal referenced to ground. Ideally, when the output lines from the external source are coupled to the recorder input terminals of corresponding polarity, positive-going input signals will move the pen in a positive direction and negative-going input signals will move the pen in a negative direction. Unfortunately, the sense of the external signal does not always yield this desired result. Instead, the sense may be backward in that positive-going signals may drive the pen off scale in a negative direction. This often occurs when the recorder input is coupled to the output of a gas chromatograph, for example. The situation may be remedied by reversing the connections of the two signal input lines to the recorder. However, the ground-referenced side of the input signal is then connected to the high impedance side of the recorder input. Consequently a substantial amount of AC noise from the power supplies is introduced into the pen driving circuitry. Oftentimes this noise is larger than the input signal thus rendering useless any graphical information plotted by the moving pen.

Several different methods have been used to reduce the undesirable noise superimposed on the input signal. One method is to couple the common input terminal of the recorder to the centertap of the power supply transformer and also to the shielding surrounding this transformer. In addition, the common terminal is floated free of ground and coupled to the ground reference through a capacitor. The disadvantage of this method used alone is that stray capacitances from ground to the opposite polarity outputs of the power supply often do not balance one another, with the result that line frequency AC noise is still present at the recorder input.

Another method of reducing input noise is to heavily filter the input signal by passing the signal through a multistage resistor-capacitor filter. The disadvantage of this method is that the filter causes the recording pen to react slowly to changing input signals.

Both methods described above have been used with some success in presently available recorders, such as the Model 7035B X-Y Plotter available from the Hewlett-Packard Company, Palo Alto, California. While these methods have substantially reduced the noise problems, they have not totally eliminated noise and thus are not satisfactory for all signal input applications.

SUMMARY OF THE INVENTION

The present invention permits the sense of the input signal to a moving pen recorder to be reversed easily and eliminates objectionable noise which adversely affects the pen driving circuitry. The invention also obviates the need for noise reducing filters at the signal input and thus greatly improves the speed of the pen response when rapidly changing input signals are received.

In the illustrated embodiment of the invention, a differential servoamplifier drives a servomotor, which in turn mechanically drives a recording pen to produce a graphical record. The two differential inputs to the servoamplifier are coupled respectively to the input signal and to a pen position feedback circuit including a potentiometer which varies in response to pen movement. The invention features two polarity reversing switches. One of these is coupled between the output of the servoamplifier and the input to the servomotor. The other switch is coupled between the feedback potentiometer and a dual polarity reference voltage source. The two switches are operated synchronously to reverse the sense of the pen driving circuitry while maintaining each output line from the external signal source connected to the like polarity input terminal of the recorder.

BRIEF DESCRIPTION OF THE DRAWING

FIG. 1 is a combined schematic and block diagram illustrating the preferred embodiment of the pen driving circuit incorporating the present invention.

FIG. 2 illustrates an alternative form of the signal source shown in FIG. 1.

DESCRIPTION OF THE PREFERRED EMBODIMENT

Referring now to FIG. 1, there is shown a device 11 containing a signal source $E_s$ which provides analog signals to be graphically recorded. The device 11 represents any one of a variety of output devices, such as a gas chromatograph or differential thermal analyzer. Signal source $E_s$ has a negative terminal referenced to ground and coupled to output line B. The positive-going signals from source $E_s$ are applied through the source output impedance $R_s$ to output line A.

Signal output lines A and B are coupled respectively to a first input terminal 13 and a common input terminal 15 of a moving pen graphical recorder. The input signal to the recorder is applied across a voltage divider 17 having a plurality of outputs coupled to the terminals of a selector switch 19. The wiper arm 21 of the selector switch 19 may be set to select a desired attenuation of the input signal. The signal from the selector switch 19 is conducted through an input resistor 23 to one input of a differential servoamplifier 25. The output of amplifier 25 is coupled by a first polarity reversing switch 27, hereinafter described, to the input of a servomotor 29.

Servomotor 29 has a mechanical output which is coupled to a recording pen. The pen is represented diagrammatically by block 31 and the mechanical linkage by the dashed line 33. As shown, the output of servomotor 29 is also mechanically linked to the wiper arm 35 of a variable potentiometer 37. Potentiometer 37, recording pen 31 and the mechanical linkage to servomotor 29 may be of conventional design, such as that used in the aforementioned Model 7035B X-Y Plotter manufactured by the Hewlett-Packard Company.

The fixed resistance portion of potentiometer 37 has one end terminal coupled to the common terminal 15, and a reference voltage terminal coupled through a second polarity reversing switch 39 to a bipolar reference voltage source 41. The wiper arm 35 of potentiometer 37 is coupled through a resistor 43 to the other input of differential servoamplifier 25.

In operation, input signals received at terminals 13, 15 are amplified by differential servoamplifier 25 and drive the servomotor 29, which in turn moves the pen 31 and changes the resistance of variable potentiometer 37. This change in resistance causes a change in the voltage applied to one of the two differential inputs to amplifier 25. Servomotor 29 continues to move the pen 31 until the two signals applied to the differential inputs to amplifier 25 reach a predetermined relationship. The position feedback servo-loop formed by this arrangement operates in the conventional manner.

In the normal mode of operation, the external device 11 has its negative signal output line referenced to ground as shown in FIG. 1, and positive-going signals drive the pen in a positive direction, e.g., to the right along the X axis or upward along the Y axis in an X-Y plotter. In this case, the sense of the input signal is the same as that of the pen driving circuit.

In another mode of operation, the recorder receives a signal having a reverse polarity from that shown in FIG. 1. In other words the signal source $E_s$ has its positive output line referenced to ground. This different electrical configuration is represented as external device 43 shown in FIG. 2. In this case, in heretofore known recorders of the type described above, the sense of the input signal would be opposite to that of the pen driving circuit, i.e., positive signals would tend to drive the pen off scale in a negative direction. However, this problem is nonexistent in the circuit of the present invention because it includes the first and second polarity reversing switches 27 and 39.

The first polarity reversing switch 27 is a double-pole double-throw type and includes a first common terminal 45 coupled to the output of amplifier 25 and a second common terminal 47 coupled to the common input terminal 15. Switch 27 also has a first pair of output terminals 49, 51 coupled respectively to input terminals 53, 55 of servomotor 29, and a second pair of output terminals 57, 59 oppositely coupled to the servomotor terminals 53, 55. The second polarity reversing switch 39 is a single-pole, double-throw type and includes a common terminal 61 coupled to the potentiometer 37 and two terminals 63, 65 coupled respectively to the positive and negative outputs of reference voltage source 41.

The two switching arms 67, 69 of switch 27 are mechanically linked together and also linked to the switching arm 71 of switch 39, as shown diagrammatically by the dashed line 73, so that they are operated simultaneously. When switches 27, 39 are in the position shown, the servomotor 29 drives the pen in a positive direction in response to positive-going signals at input terminal 13. When these switches are in the alternate position, the polarity of the signals applied from amplifier 25 to servomotor 29 is reversed and potentiometer 37 is referenced to a negative instead of a positive voltage. Thus, negative-going signals, from external source 43, will drive the pen in a reverse sense, i.e., in a positive direction.

It is to be noted that the polarity reversing switch 27 is coupled between the servoamplifier 25 and servomotor 29 rather than at the input terminals 13, 15, as in many prior art recorders. Switch 27 and its location in the circuit, in combination with polarity reversing switch 39 permit the sense of the pen control signals to be reversed without reversing the sense of the mechanical drive of the servomotor 29. Undesirable noise is not introduced into the system because the grounded or low impedance output (line B) of the signal source 11 or 43 is maintained coupled to the low impedance common input terminal 15.

I claim:

1. A moving pen graphical recording system comprising:
a servomotor having a pair of input terminals and a mechanical output for driving a recording pen;
potentiometer means for providing a variable resistance output responsive to the position of said recording pen, said potentiometer means including an output, a reference terminal, and a bipolar voltage source coupled to said reference terminal;
a first input terminal and a common input terminal for receiving control signals to drive said servomotor;
differential servoamplifier means coupled to said first input terminal and to the output terminal of said potentiometer means for driving said servomotor in response to the control signal applied to said first and common input terminals and to the position of said recording pen;
first means for reversing the polarity of the control signals applied to said servomotor, said polarity reversing means being coupled in series between the output of said servoamplifier means and the input to said servomotor; and
second means for reversing the polarity of the voltage source coupled to the reference terminal of said potentiometer means, said second polarity reversing means being coupled in series between said reference terminal and said bipolar voltage source and operable in synchronism with said first polarity reversing means;
whereby said first and second polarity reversing means operate to reverse the sense of control signals with reference to said common input terminal without reversing the mechanical drive sense of the servomotor.

2. The system of claim 1, wherein said first polarity reversing means includes a double-pole, double-throw switch having two common input terminals coupled respectively to said output of said differential servoamplifier means and to the common input terminal which receives said control signals, said double-pole, double-throw switch also having a pair of oppositely poled output terminals associated with each of said two common input terminals, each output terminal of one pair being coupled to the oppositely poled terminal of the other pair and to a different one of the input terminals of said servomotor.

3. The system of claim 2, wherein said second polarity reversing means includes a single-pole, double-throw switch having a common terminal coupled to the reference terminal of said potentiometer and a pair of switched terminals coupled respectively to opposite polarity terminals of said bipolar voltage source.

* * * * *